United States Patent [19]

Szuminski et al.

[11] Patent Number: 4,519,543
[45] Date of Patent: May 28, 1985

[54] VECTORABLE NOZZLES FOR TURBOMACHINES

[75] Inventors: Gary F. Szuminski, Marietta, Ga.; Thomas J. Jones, Bristol, England

[73] Assignees: Rolls-Royce Inc., New York, N.Y.; Rolls-Royce Limited, London, England

[21] Appl. No.: 376,388

[22] Filed: Apr. 7, 1982

[51] Int. Cl.³ .............................................. B63H 11/10
[52] U.S. Cl. ................................ 239/265.19; 60/228; 244/12.5; 244/23 D
[58] Field of Search ...................... 239/265.19, 265.29, 239/265.39, 265.41; 60/232, 228, 262, 271, 430, 465, 224, 226.1, 229, 230; 244/110 B, 12.5, 23 D

[56] References Cited

U.S. PATENT DOCUMENTS

| | | |
|---|---|---|
| 3,064,923 | 11/1962 | Reiniger . |
| 3,067,579 | 12/1962 | Olbrich . |
| 3,260,049 | 7/1966 | Johnson . |
| 3,480,236 | 11/1969 | Nash . |
| 3,633,847 | 1/1972 | Fricke et al. . |
| 3,972,490 | 8/1976 | Zimmermann .................. 244/12.5 |
| 3,979,067 | 9/1976 | Nash ................................ 244/12.5 |
| 3,989,193 | 11/1976 | Vedova et al. . |
| 4,000,610 | 1/1977 | Nash ................................ 244/12.5 |
| 4,248,041 | 2/1981 | Wilde .............................. 244/12.5 |
| 4,363,445 | 12/1982 | Bouiller et al. . |

FOREIGN PATENT DOCUMENTS

| | | |
|---|---|---|
| 2262736 | 9/1975 | France . |
| 91723 | 10/1953 | Netherlands . |
| 327871 | 3/1958 | Switzerland . |
| 1491528 | 11/1977 | United Kingdom . |

Primary Examiner—Donald P. Walsh
Attorney, Agent, or Firm—Cushman, Darby & Cushman

[57] ABSTRACT

A vectorable nozzle 17 comprising a fixed first duct 21 a rotatable second duct 22 scarfed at its rear end and a rotatable third duct 23 scarfed at its front end. The second and third ducts 22,23 are mounted in bearings 24,26 respectively and the bearing 26 is constrained to swing bodily about trunnions 29, the axis of which lies transverse to the ducts 22,23, and a screw jack 32 is provided to rotate the bearing 26 about the trunnions 29. The second and third ducts 22,23 are provided with means to rotate them in opposite directions in syncronism with the rotation of the bearing 26 in the trunnion 29.

6 Claims, 3 Drawing Figures

VECTORABLE NOZZLES FOR TURBOMACHINES

This invention relates to vectorable nozzles for turbomachines, that is to say propulsion nozzles which can be directed selectively in predetermined directions relative to the remainder of the turbomachine to produce propulsive thrust in selected directions.

An example of a turbomachine having vectorable nozzles is Rolls-Royce Limited's Pegasus ® gas turbine aero engine which is designed for the Harrier Jump Jet, the AV8A and AV8B aircraft.

The Pegasus ® engine, as designed for the abovementioned aircraft, comprises a by-pass type gas turbine engine in which part of the by-pass air is discharged through two vectorable nozzles and part is supplied to the core engine to drive the turbine and produce propulsive thrust. The hot efflux gases from the turbine is fed via a bifurcated jet pipe to two vectorable "hot" nozzles. By rotating the nozzles from a direction pointing rearwards to a position pointing downwards the thrust produced by the nozzles may be selectively directed respectively forwards for forward flight or upwards for vertical take-off and landing.

Instead of discharging the efflux of hot gases from the engine's turbines through a bifurcated jet-pipe, and hence from two vectorable nozzles, it is also known to provide a single jet pipe with a nozzle thrust to produce forwards or upwards directed thrust.

With ever increasing speeds of aircraft and the need to reduce weight and cost of such engines, there is a need for vectorable nozzles that are mechanically simple to operate, lightweight and robust.

The invention, as claimed, provides a vectorable nozzle for a turbomachine, which is simple to operate robust and lightweight.

The invention will now be described by way of an example with reference to the accompanying drawings in which.

Figure 1:
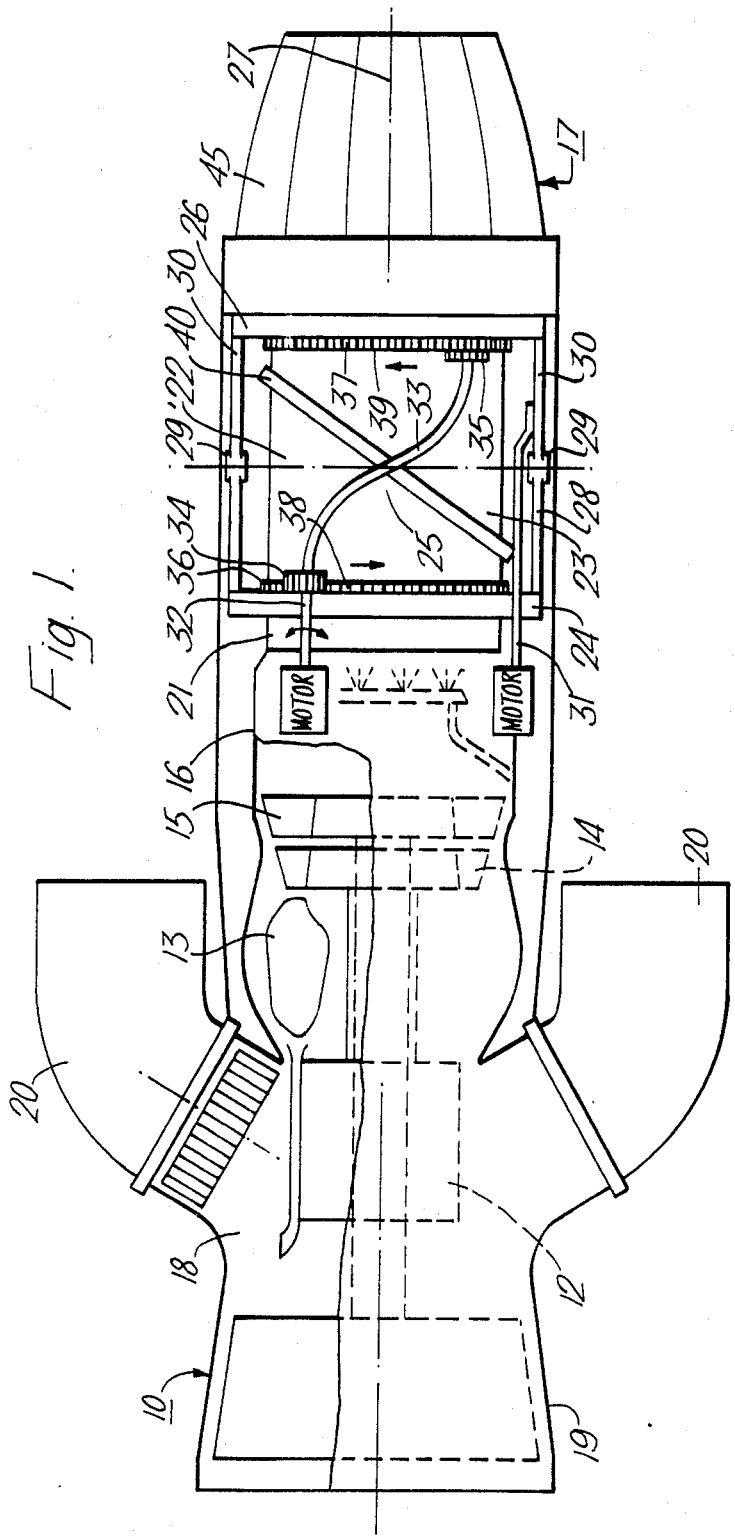
FIG. 1 illustrates schematically a plan view of a gas turbine engine fitted with a vectorable rear nozzle constructed in accordance with the present invention.

Referring to FIG. 1 there is shown a gas turbine aero engine 10 of the by-pass type. The engine comprises in flow series, an axial flow low pressure compressor 11, an axial flow high pressure compressor 12, a combustion chamber 13, a high pressure turbine 14 which drives the H.P. compresssor 12, a low pressure turbine 15 which drives the L.P. compressor 11, and a jet pipe 16 terminating in a vectorable nozzle 17 constructed in accordance with the present invention.

The L.P. compressor 11 supplies compressed air to the H.P. compressor 12 and to a plenum chamber 18 which forms part of the by-pass duct 19 and which terminates in two vectorable nozzles 20.

Figure 2:
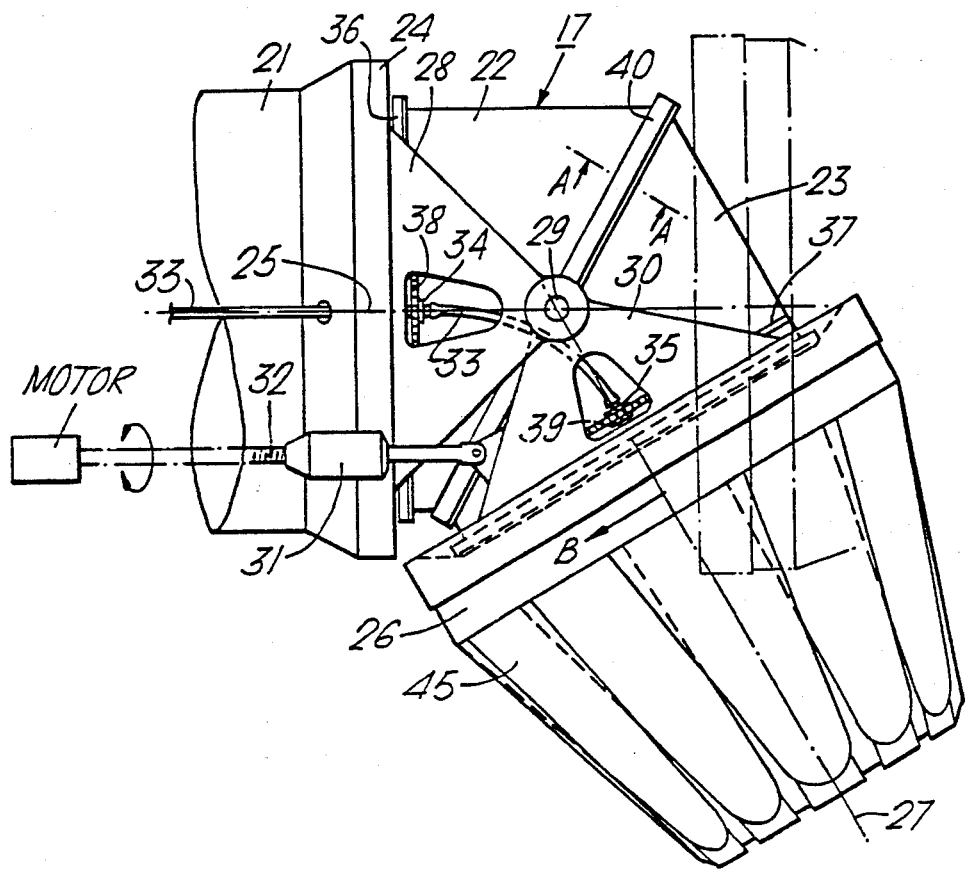
FIG. 2 illustrates in greater detail a side view of a rear nozzle suitable for the engine of FIG. 1, and, FIG. 3 illustrates schematically the seal at the scarfed joint between the ducts of the nozzle of FIG. 2.
Figure 3:
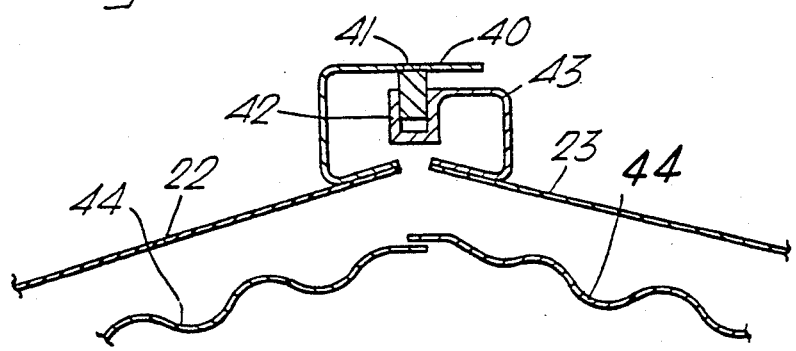

Referring to FIGS. 2 and 3 the nozzle 17 comprises a first fixed duct 21 and two rotatable ducts 22,23. The second duct 22 is mounted in a first bearing 24 for rotation about its longitudinal axis and is scarfed at its rear end. That is to say that its end lies in a plane which is at an angle to the longitudinal axis 25 of the second duct 22. The third duct 23 is similarly scarfed so that its end adjacent the second duct 22 is parallel to the end of the second duct. The third duct is mounted in a second bearing 26 for rotation about its longitudinal axis 27.

The duct 22 is of circular cross-sectional shape in the plane of the bearing 24 and in the plane of the joint between the ducts 22,23. Similarly, the duct 23 is of circular cross-section in the plane of the joint between the ducts 22,23 and in the plane of the bearing 26.

The fixed duct 21 is provided with two side plates 28 which project parallel to the axis 25 and have trunnions 29, the axis of which extends transverse to the axis 25.

The outer race of the second bearing 26 is provided with two side plates 30 and bushes locate on the trunnions 29 and constrains the bearing 26 to swing bodily about the trunnions 29. The second bearing 26 is rotated bodily about the axes of the trunnions 29 by means of a screw jack which has a lead screw 32 and rotating ball type of nut 31. The nut 31 is fixed to the fixed structure of duct 21 and rotation of the lead screw 32 moves the end of the lead screw 32 in axial directions. The lead screw 32 operates on the plate 30 to swing the bearing 26 bodily about the axis of the trunnions. Simultaneously, the ducts 22 and 23 must be rotated in opposite directions so that the ducts 22 and 23 accommodate the movement of the bearing 26 relative to bearing 24.

A motor is provided to drive a flexible drive shaft 33 that has mounted on it two chain sprockets 34, 35. A chain sprocket 36,37 is provided on each of the ducts 22,23 parallel to the plane of the respective bearing 24 or 26 in which the duct 22,23 rotates. The sprockets 34,35 rotate together in the same direction when the shaft 32 is rotated, and chains 38,39 are provided to transmit the drive from the sprockets 34,35 to the sprockets 36,37. The sprockets 34 engages the outer perimeter of the chain loop 38 whereas the sprockets 35 engages the inner perimeter of the chain loop 39. In this way, the ducts 22 and 23 are driven at the same speed in opposite directions.

Rotation of the shaft 33 must be synchronised with the rotation of the bearing 26 about the trunnions 29 in order not to cause the ducts 22,23 to jam themselves as the bearing 26 rotates.

The joint between the ducts 22,23 is shown in more detail in FIG. 3. Referring to FIG. 3, the duct 22 has a graphite polymide stiffening ring 39 around its circumference at the scarfed end. The ring 40 presents an inward facing circumferential surface against which an annular reinforced carbon seal 41 bears. The seal 41 is accommodated in an outward facing recess 42 provided on a graphite polymide stiffening ring 43 which is secured around the circumference of the duct 23.

The ducts 22,23 are of lightweight thin titanium sheet and a thin heat shield liner 44, carried by each duct 22,23 is located concentrically within each of the ducts 22,23. The liners 44 overlap at the scarfed joint to protect the seal 41 from the hot exhaust gases flowing through the ducts 22,23.

If desired the annular seal 41, and stiffening rings 40 and 43 may be replaced by a third bearing, one race of which is secured to the duct 22, and the other of which is secured to duct 23. In this case the third bearing and the scarfed ends of the ducts 22, 23 are constructed to form a gas tight seal at the joint between the ducts 22,23.

The outer race of the bearing 26 also carries a fourth duct 45 which defines the outlet area of the nozzle. If desired, the fourth duct 45 could be omitted and in this case the outlet area of the nozzle would be defined by the downstrean end of the third duct 23 or the inner race of the bearing 26 providing that the bearing itself is shielded from the hot gases flowing through the ducts 22,23. Alternatively, the fourth duct 45 may be provided with means (not shown) for varying the area of the nozzle outlet.

The main advantages of the vectorable nozzle of the present invention are that the trunnions 29 are not located in the hot gas environment and they carry the major deflecting, presssures blow off, thrust and "G" loads. In other prior known nozzles the scarfed ducts carry these loads and are very much more robust and heavier. With the present invention the ducts can be supported in less expensive lighter large diameter bearings and need only be designed to cater for internal jet pipe pressures and flow turning loads. Furthermore the seal 41 simplifies the design and allows for radial and axial misalignment due to thermal effects or control errors during vectoring. The seal is more tolerant to misalignments than would be a bearing at the scarfed joint. These features also reduce the actuation loads required to rotate the ducts, enabling less expensive, lighter more reliable components to be used, and also reduces the actuation loads required to rotate the assembly about the axis of the trunnions. Furthermore these features remove the necessity to use complicated gearboxes to ensure that the nozzle exit opening moves in a vertical plane without sideways or yawing movements.

We claim:

1. A vectorable nozzle for a turbomachine comprising: a first duct; a second duct mounted in a first bearing for rotation about its longitudinal axis relative to the first duct, the second duct terminating at its downstream end in a plane that lies at an angle to the axis of rotation of the second duct; a third duct mounted in a second bearing for rotation about its longitudinal axis relative to the second duct, the third duct having its upstream end parallel to the downstream end of the second duct; a seal means for effecting a gs tight seal between the second and third ducts; constraining means for constraining the second bearing to swing bodily about an axis transverse to the length of the first duct; and means to rotate the second duct about its axis of rotation and operable to rotate the third duct in the opposite direction to that of the second duct in synchronism with the rotation of the second bearing bodily about the axis transverse to the first duct.

2. A vectorable nozzle according to claim 1 wherein the second bearing is mounted to rotate in trunnions that are fixed relative to the first duct.

3. A vectorable nozzle according to claim 1 wherein a fourth duct which defines the nozzle outlet is carried by the second bearing.

4. A vectorable nozzle according to claim 3 wherein the fourth duct includes means for varying the area of the nozzle outlet.

5. A vectorable nozzle according to claim 1 wherein the upstream end of the third duct is mounted in a third bearing carried by the downstream end of the second duct.

6. A vectorable nozzle according to claim 1 wherein the seal means comprises: a structure around the circumference of the second duct adjacent the joint between the second and third ducts, which structure defines a first sealing surface; a second structure around the circumference of the third duct adjacent the joint between the second and third duct, which second structure defines a second sealing surface; and a sealing member in sealing contact with the first and second sealing surfaces.

* * * * *